(12) United States Patent
Kim

(10) Patent No.: US 9,965,855 B2
(45) Date of Patent: May 8, 2018

(54) METHOD OF DETERMINING SAMPLE SIMILARITY IN DIGITAL PATHOLOGY SYSTEM

(71) Applicant: Infinitt Healthcare Co., Ltd., Seoul (KR)

(72) Inventor: Sung Yong Kim, Seoul (KR)

( * ) Notice: Subject to any disclaimer, the term of this patent is extended or adjusted under 35 U.S.C. 154(b) by 143 days.

(21) Appl. No.: 15/217,278

(22) Filed: Jul. 22, 2016

(65) Prior Publication Data

US 2018/0018765 A1    Jan. 18, 2018

(30) Foreign Application Priority Data

Jul. 12, 2016 (KR) ........................ 10-2016-0087787

(51) Int. Cl.
| | | |
|---|---|---|
| *G06K 9/00* | (2006.01) | |
| *G06T 7/00* | (2017.01) | |
| *G06T 7/60* | (2017.01) | |

(52) U.S. Cl.
CPC .......... *G06T 7/0012* (2013.01); *G06T 7/0028* (2013.01); *G06T 7/0085* (2013.01); *G06T 7/60* (2013.01); *G06T 2207/10004* (2013.01)

(58) Field of Classification Search
None
See application file for complete search history.

(56) References Cited

U.S. PATENT DOCUMENTS

| | | | | |
|---|---|---|---|---|
| 8,244,021 | B2 * | 8/2012 | Lett .................... | G01N 21/6428 |
| | | | | 382/128 |
| 2003/0012420 | A1 * | 1/2003 | Verwoerd ............. | G06T 7/0012 |
| | | | | 382/133 |
| 2004/0170325 | A1 * | 9/2004 | Eichhorn ........... | G06K 9/00147 |
| | | | | 382/205 |
| 2012/0257811 | A1 * | 10/2012 | Metzger ................ | G06T 7/0012 |
| | | | | 382/133 |
| 2012/0275671 | A1 * | 11/2012 | Eichhorn .............. | G06T 7/0004 |
| | | | | 382/128 |
| 2017/0103521 | A1 * | 4/2017 | Chukka ................. | G06T 7/0012 |

FOREIGN PATENT DOCUMENTS

KR     10-1559798     10/2015

OTHER PUBLICATIONS

English translation of 10-1559798.

\* cited by examiner

*Primary Examiner* — Shervin Nakhjavan

(74) *Attorney, Agent, or Firm* — Antonio Ha & U.S. Patent, LLC

(57) ABSTRACT

Disclosed is a sample similarity measurement method for a digital pathology system. The sample similarity measurement method during a process of a digital pathology system includes extracting a first main area and a second main area of each of a first digital slide image and a second digital slide image; aligning the first main area and the second main area; classifying sample types of the first main area and the second main area when the alignment is successful; and measuring similarity of the first main area and the second main area when the sample types are the same.

6 Claims, 8 Drawing Sheets

| Number of objects | Object size | arrangement | Type |
|---|---|---|---|
| Single Object | Object size/ROI size < 0.6 | - | Type 1 |
| | Object size/ROI size >= 0.6 | - | Type 2 |
| Multi objects | Object size/ROI size < 0.6 | Row | Type 3 |
| | | Col | Type 4 |
| | | Mix | Type 5 |
| | Object size/ROI size >=0.6 | Row | Type 6 |
| | | Col | Type 7 |
| | | Mix | Type 8 |

| 1bin | 2bin | 3bin |  |  |  |  |  |
|---|---|---|---|---|---|---|---|
|  |  |  |  |  |  |  |  |
|  |  |  |  |  | 22bin | 23bin | 24bin |

METHOD OF DETERMINING SAMPLE SIMILARITY IN DIGITAL PATHOLOGY SYSTEM

CROSS-REFERENCE TO RELATED APPLICATION

This application claims priority to and the benefit of Korean Patent Application No. 2016-0087787, filed on Jul. 12, 2016, the disclosure of which is incorporated herein by reference in its entirety.

BACKGROUND

1. Field

The present invention relates to a method of measuring sample similarity in a digital pathology system, and more particularly, to a sample similarity measurement method for a digital pathology system that may solve a problem of having to check samples in every step to prevent the samples from being unintentionally mixed with each other in a scanning step, etc. through a tissue sample during a processing process of the digital pathology system.

2. Discussion of Related Art

Pathology is a basic medical science for studying a state of a disease or a change in a tissue structure, an organic form, or an organic function of a pathogen in order to find a cause of the disease.

In particular, digital pathology is an image-based information environment which is enabled by computer technology that allows for the management of information generated from a digital slide. Digital pathology is enabled in part by virtual microscopy, which is the practice of producing an image with a microscope and delivering the produced image to a computer network.

Digital pathology is globally recognized as an emerging field of diagnostic medicine. This is because, compared to a well-known and existing method, digital pathology may achieve even better, faster and cheaper diagnosis, prognosis and prediction of cancer which is the biggest enemy of modern people's health or other important diseases.

As in the above, digital pathology is getting the spotlight as an emerging field of diagnostic medicine. However, the research and development is still in an early stage. The current stage of the research and development can be guessed from the following circumstance. In Korea, there is little research and development on a digital pathology system, and also there is no product associated with the research and development. Even in foreign countries, there is no digital pathology system that is approved for primary diagnosis by the U.S. Food and Drug Administration (FDA).

In such a digital pathology system, a task of adding a manual barcode is performed in each of the preprocessing steps of producing a digital slide image, i.e., grossing, waxing, paraffin blocking, sectioning, or staining. However, human errors are likely to occur in this system, and actually multiple errors do occur.

Examining related patent documents, Korean Patent No. 10-1559798, which was registered on Oct. 6, 2015, discloses a method for normalizing an image in digital pathology. In detail, the above patent document discloses the steps of choosing a sample for image normalization, analyzing a spectrum of a certain part of the chosen sample to collect information about a material included in the certain part of the sample, finding a correlation equation through the collected information, correcting the entire image of the sample using the correlation equation, and normalizing the image of the sample through the corrected image.

However, the related patent document says nothing about a technology for recognizing and preventing a problem of the human errors as described above.

SUMMARY

The present invention provides a sample similarity measurement method for a digital pathology system that may solve a problem of having to check samples in every step to prevent the samples from being unintentionally mixed with each other in a scanning step, etc. through a tissue sample during a processing process of the digital pathology system.

According to an aspect of the present disclosure, there is provided a sample similarity measurement method for a digital pathology system. The sample similarity measurement method includes extracting a first main area and a second main area of each of a first digital slide image and a second digital slide image; aligning the first main area and the second main area; classifying sample types of the first main area and the second main area when the alignment is successful; and measuring similarity of the first main area and the second main area when the sample types are the same.

The classifying of sample types may include determining whether there is a single sample or there are multiple samples through the number of central points detected in the first main area and the second main area; determining sizes of the samples of the first main area and the second main area; determining an arrangement shape of the samples as one of a vertical arrangement, a horizontal arrangement, and a mixture arrangement through an up-down and left-right position relation between the detected central points, and classifying types of the samples based on the singularity/plurality determination for the samples, the sizes of the samples, and the arrangement shape of the samples.

The measuring of similarity of the first main area and the second main area may include, when there is one sample, measuring the similarity through shape information of the sample, color information of the sample, and edge directivity and intensity of the sample. The edge directivity and intensity of the sample are measured by performing cutting with three concentric circles and at an angle of 45 degrees with respect to edge points corresponding to the first main area and the second main area, performing a division into 24 sections to set a search section (each section includes the number of surrounding edge points in the section, average color information of the surrounding edge points in the section, average edge intensity of the surrounding edge points in the section, and vector direction information of the surrounding edge points in the section), and comparing information about the 24 sections of the edge points corresponding to the first main area and the second main area. The measuring of similarity of the first main area and the second main area may include, when there are multiple samples, measuring the similarity through shape information of the sample, color information of the sample, and edge directivity and intensity of the sample, information regarding distances between objects in the sample, and a cluster shape in which the objects are formed.

The sample similarity measurement method may further include determining that the sample similarity measurement has failed when the alignment fails.

The sample similarity measurement method may further include determining that the samples are different and ending the measurement when the sample types are classified as being different.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
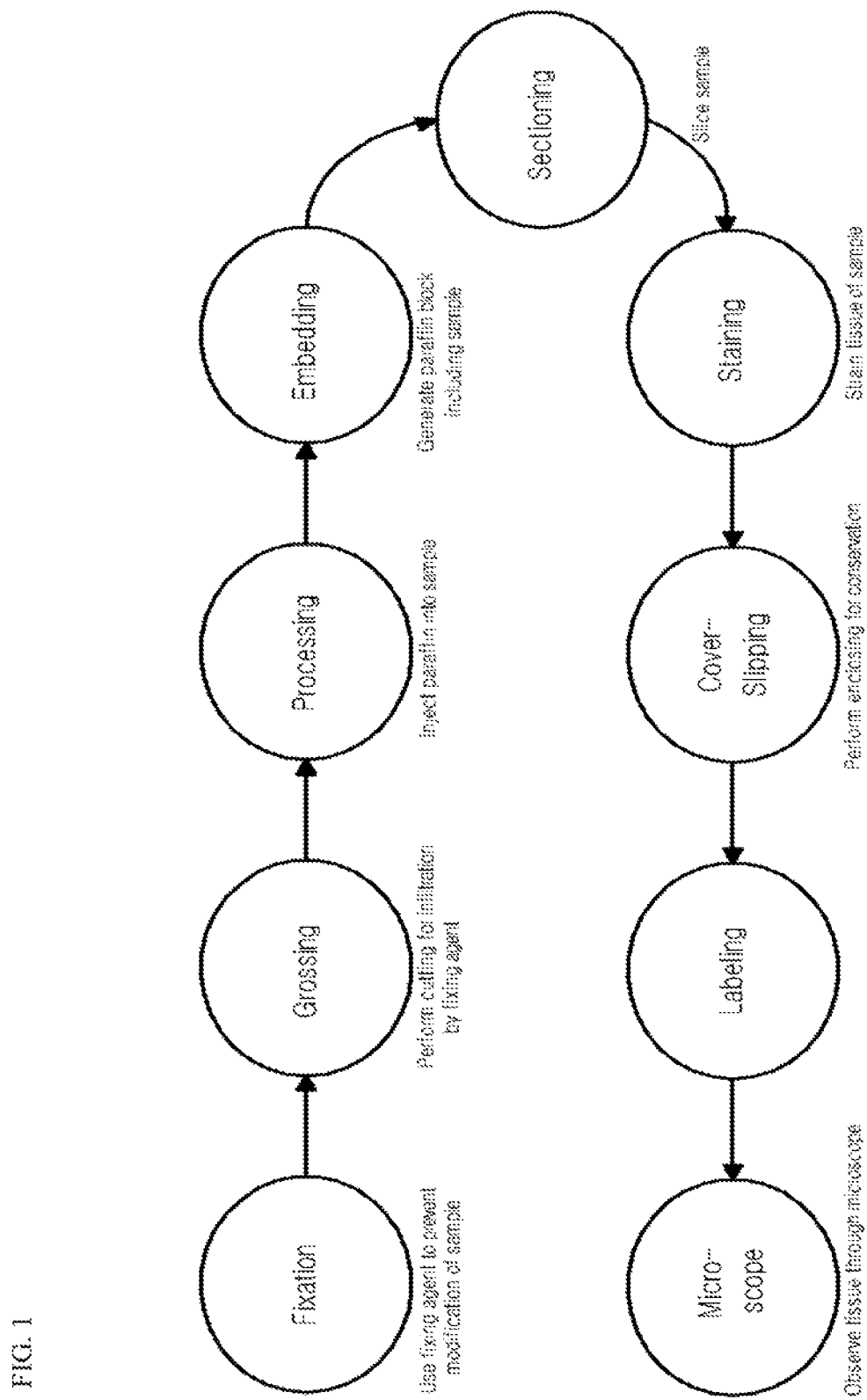
FIG. 1 is a view showing a conventional sample extraction flow.

Hereinafter, preferred embodiments of the present invention will be described below in more detail with reference to the accompanying drawings. Terms and words used in the specification and the claims shall not be interpreted as commonly-used dictionary meanings, but shall be interpreted as to be relevant to the technical scope of the invention based on the fact that the inventor may properly define the concept of the terms to explain the invention in best ways.

Therefore, the embodiments and the configurations depicted in the drawings are for illustrative purposes only and are not intended to represent all technical scope of the embodiments, so it should be understood that various equivalents and modifications may exist at the time of filing this application.

Figure 2:
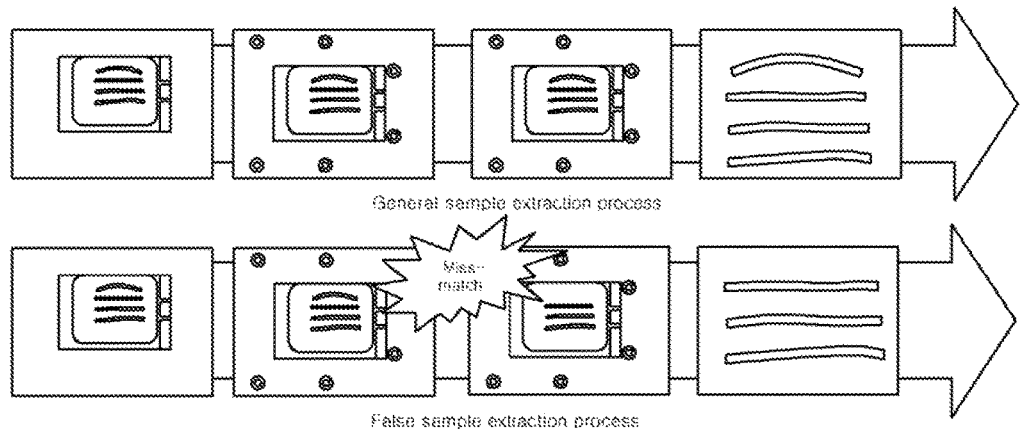
FIG. 2 is a view schematically showing a problem of the conventional technology.

FIG. 1 is a view showing a conventional sample extraction flow, and FIG. 2 is a view schematically showing a problem of the conventional technology.

As described in the Background and shown in FIG. 1, a fixation step of fixing a sample with a fixing agent in order to prevent modification of the sample, a grossing step of performing cutting in order for the fixing agent to infiltrate the sample, a processing step of injecting paraffin into the sample, an embedding step of generating a paraffin block containing the sample, a sectioning step of slicing the sample, a staining step of staining a tissue of the sample, and a cover-slipping step of performing enclosing for conservation, a labeling step, and a micro-scoping step of observing the tissue through a microscope are performed.

In an embedding step, samples may be mixed with each other because a group is embedded through a basket. Furthermore, the mixing may occur even in subsequent steps because the steps are manually performed. FIG. 2 is a view showing a case in which samples are switched due to the mixing.

Figure 3:
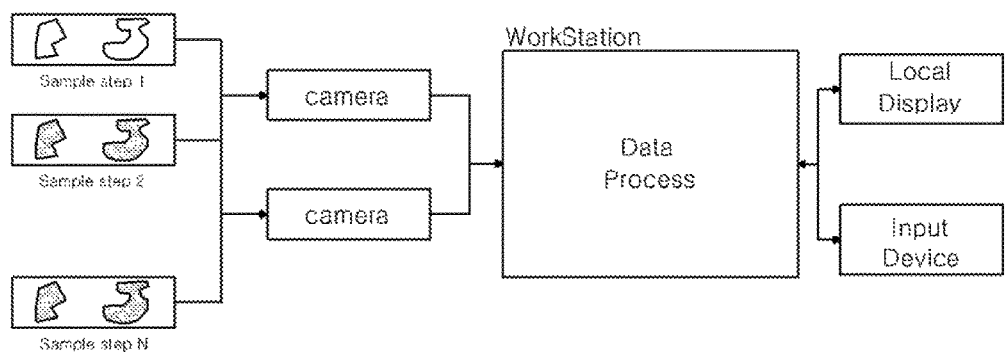
FIG. 3 is a view showing a system according to the present invention.
Figure 15:
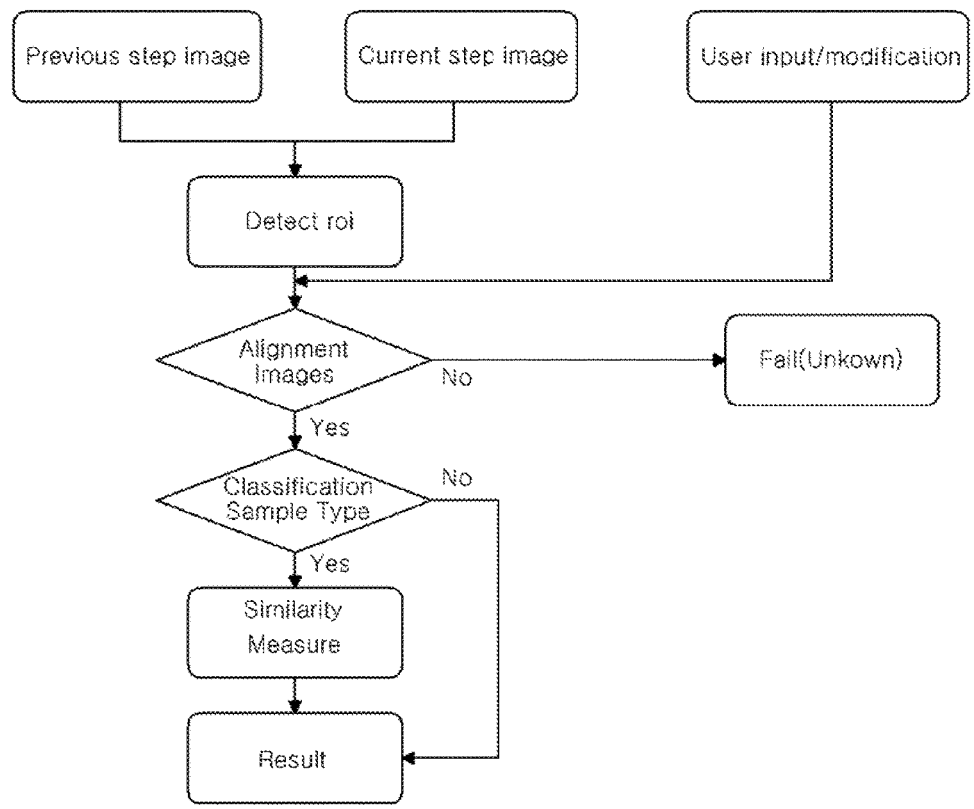
FIG. 15 is a flowchart showing a sample similarity measurement method for a digital pathology system according to the present invention.

FIG. 3 is a view showing a system according to the present invention, and FIG. 15 is a flowchart showing a sample similarity measurement method for a digital pathology system according to the present invention.

In order to solve the above-mentioned problems, as shown in FIGS. 3 and 15, a sample similarity measurement method for a digital pathology system according to an embodiment of the present invention is a method of measuring sample similarity in a processing process of the digital pathology system. The sample similarity measurement method includes extracting a first main area and a second main area from each of a first digital slide image and a second digital slide image, aligning the first main area and the second main area, classifying sample types of the first main area and the second main area when the alignment is successful, and measuring similarity of the first main area and the second main area when the sample types are the same.

Figure 4:
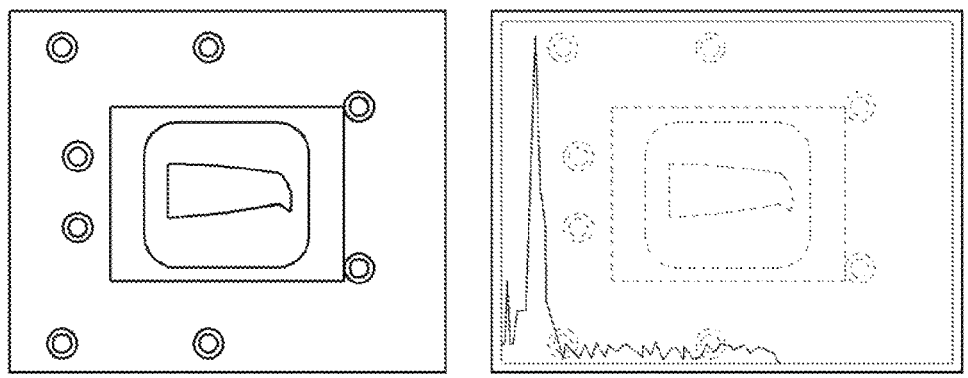
FIG. 4 is a view showing primary area classification that utilizes a color distribution chart for a digital slide image in order to extract a main area.
Figure 5:
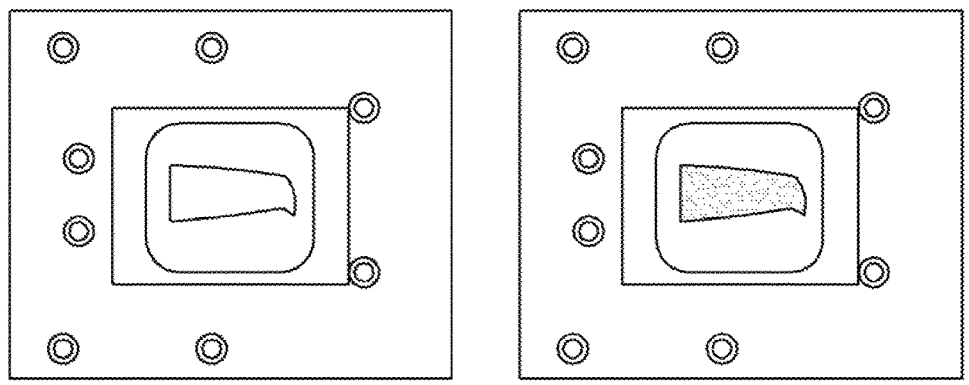
FIG. 5 is a view showing a step of detecting a main area through color bleaching after the primary area classification.
Figure 11:
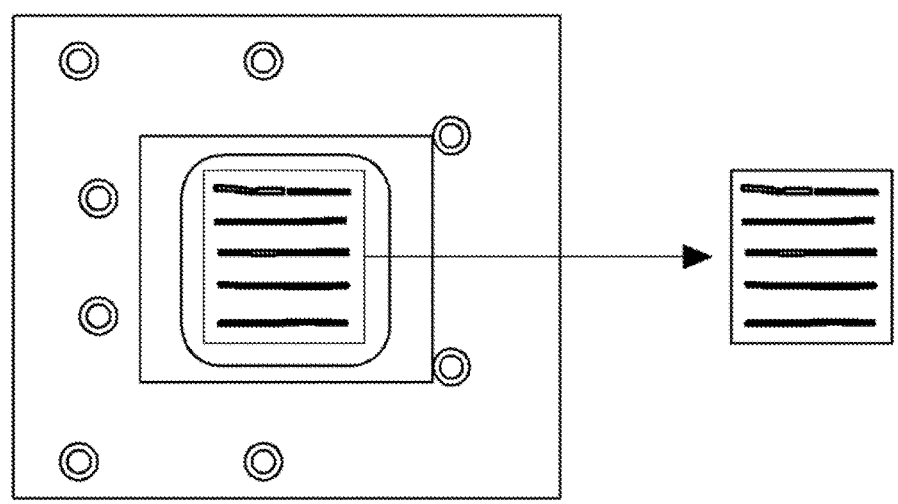
FIG. 11 is a view showing an example of extracting a main area in a digital pathology system according to the present invention.

FIG. 11 is a view showing an example of extracting a main area (ROI, region of interest) in a digital pathology system according to the present invention. In more detail, FIG. 4 is a view showing primary area classification that utilizes a color distribution chart (graph in right figure of FIG. 4) for a digital slide image in order to extract a main area, and FIG. 5 is a view showing a step of detecting a main area through color bleaching (decolorization) after the primary area classification. The left and right figure in FIG. 5 are the image before and after the decolorization. As shown in FIGS. 4 and 5, as the method of measuring sample similarity in a processing process for a digital pathology system, a method of detecting a main area through a color distribution chart in the image, that is, a method of automatically detecting a main area through separation of the color of the sample from background may be used.

Figure 12:
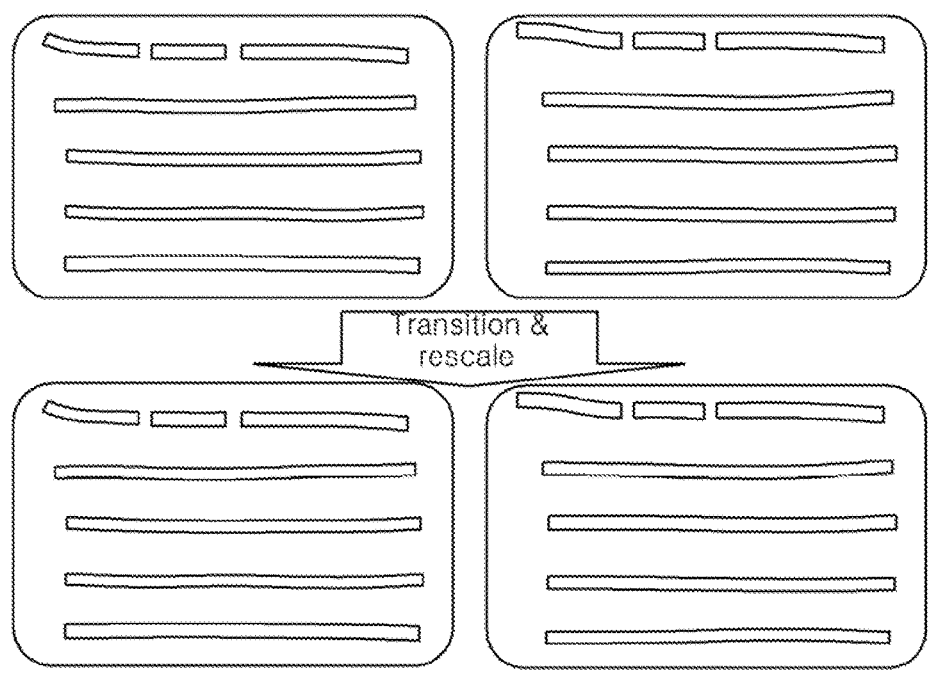
FIG. 12 is a view showing an example of aligning a first main area and a second main area extracted in a digital pathology system according to the present invention.

Next, as shown in FIG. 12, the extracted first main area (ROI) and second main area (ROI) are aligned. Here, the alignment conceptually includes rotation and rescaling in addition to up-down and left-right movement. A candidate for the up-down and left-right movement and a candidate for an angle for the rotation are determined, and whether the number of feature points before the movement and the number of feature points after the movement are the same or similar to each other is determined. Then, a final value for the up-down and left-right movement and a final value for the rotational angle may be determined. In this case, a step of determining that the sample similarity measurement has failed when the alignment fails may be further included.

Next, when the alignment is successful, sample types of the first main area and the second main area are classified. Here, the classifying of sample types includes determining whether there is a single sample or there are multiple samples through the number of central points detected in the first main area and the second main area; determining sizes of the samples of the first main area and the second main area; determining an arrangement shape of the samples as one of a vertical arrangement, a horizontal arrangement, and a mixture arrangement through an up-down and left-right position relation between the detected central points, and classifying types of the samples based on the singularity/plurality determination of the samples, the sizes of the samples, and the arrangement shape of the samples.

Figures 6, 7:
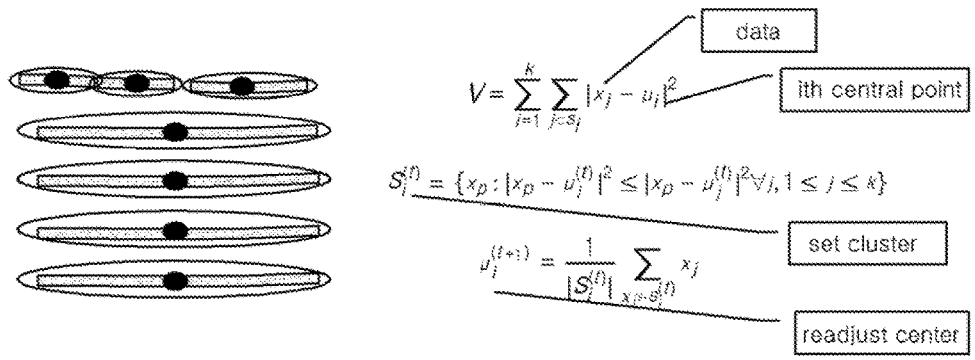
FIG. 6 is a view illustrating a method of detecting a center point of an object through K-means clustering.
FIG. 7 is a table showing a criterion for classifying sample types.

In detail, as shown in FIG. 6, the central point of an object is detected through K-means clustering, and whether there is a single sample or there are multiple samples in a digital slide image is determined through the number of central points that are detected.

A K-means clustering algorithm divides a data set of image pixels as clusters having a similar property.

The first equation in FIG. 6 finds the entire variation between a point $x_\varphi$ of a jth cluster and a center $\mu_1$ of ith cluster. In the equation, $S_1$ denotes a set of points belonging to a cluster, and k denotes the number of clusters that are initialized. The first equation finds a set of points for minimizing the sum of the entire variance, which is an objective of the K-means algorithm.

The second equation in FIG. 6 resets data in a cluster. That is, a cluster to which data has to belong is reset by comparing a center $\mu_1$ of the current cluster and a center $\mu_\varphi$ of any other cluster. In the second equation, $S_1^{(t)}$ denotes a set of points belonging to an ith cluster, $x_\pi$ denotes the current comparison target, and j is a natural number that is less than or equal to k.

The last equation in FIG. 6 updates each cluster center $\mu_1$ as the center of the reset data cluster. In this equation, a variable $|S_j^{(t)}|$ is the number of points in $S_1^{(t)}$, and $x_\varphi$ denotes a point in $S_1^{(t)}$. That is, by dividing the sum of values of all points of $S_1^{(t)}$ by the number of points, a readjustment to $\mu_1^{(t+1)}$, which is a (t+1)th average, is performed. The K-means algorithm repeats the second equation and the last equation until the cluster is not changed.

The arrangement shape of the samples is determined as one of a vertical arrangement, a horizontal arrangement, and a mixture arrangement through an up-down and left-right position relation between the detected central points.

FIG. 7 is a view showing a criterion for classifying sample types. For example, when there is one sample, and the size of the sample or the size of the main area is smaller than 0.6, the sample is classified as type 1. When there are multiple samples, the size of the samples or the size of the main area is greater than or equal to 0.6, and also the samples are arranged in a row, the samples are classified as type 6.

Next, the similarity of the first main area and the second main area is measured. In this case, when there is one sample, similarity is measured through shape information of the sample, color information of the sample, and edge directivity and intensity of the sample. The edge directivity and intensity of the sample are measured by performing cutting with three concentric circles and at an angle of 45 degrees with respect to edge points corresponding to the first main area and the second main area, performing a division into 24 sections to set a search section (each section includes the number of surrounding edge points in the section, average color information of the surrounding edge points in the section, average edge intensity of the surrounding edge points in the section, and vector direction information of the surrounding edge points in the section), comparing information about the 24 sections of the edge points corresponding to the first main area and the second main area. In this case, the similarity may also employ the number or rate of sections that are identical among 24 sections. In more detail, the number or rate of cases in which the number of surrounding edge points in the section, average color information of the surrounding edge points in the section, average edge intensity of the surrounding edge points in the section, or vector direction information of the surrounding edge points in the section is identical may also be employed as the similarity.

In addition, when there are multiple samples, the similarity may be measured in the same way as that of the case in which there is a single sample. However, the similarity may be measured by adding information regarding distances between objects in the sample and a cluster shape in which the objects are formed, in addition to shape information of the sample, color information of the sample, and edge directivity and intensity of the sample.

In addition, a step of determining that the samples are different and ending the measurement when the sample types are classified as being different may be further included.

Figure 8:
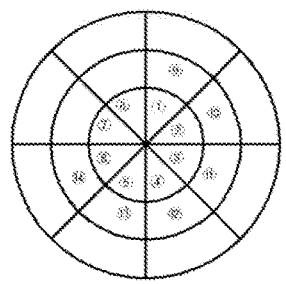
FIG. 8 is a view showing an example of performing a division into 24 sections to set a search section and storing information about each section in a comparison descriptor storage for an edge point.
Figure 9:
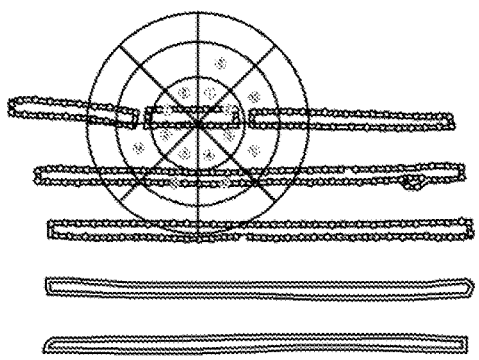
FIG. 9 is an exemplary view showing a comparison using information about 24 sections.
Figure 9:
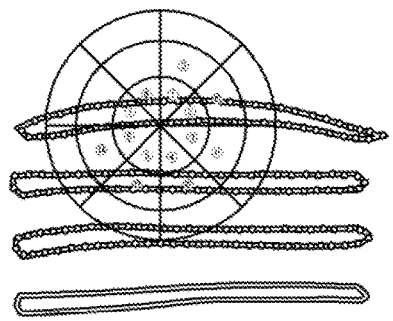
Figure 10:
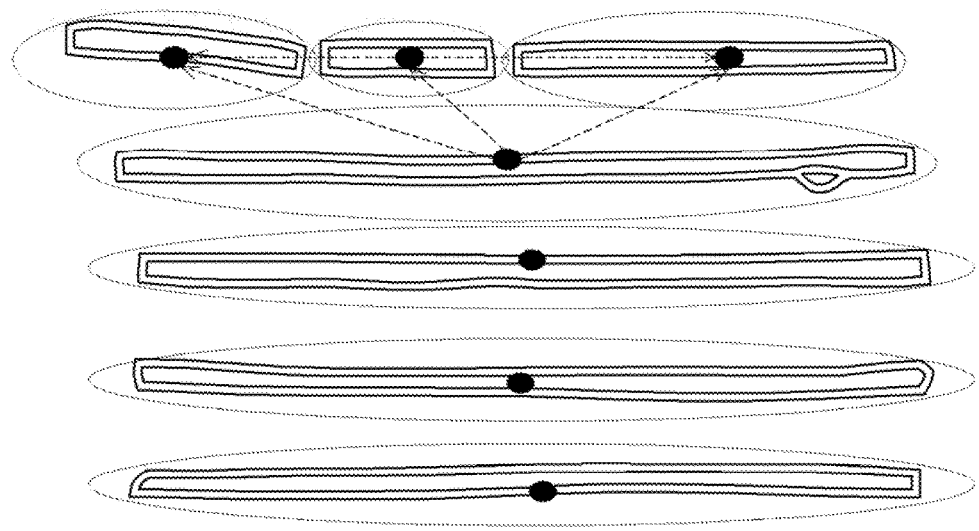
FIG. 10 is a view showing an example of measuring information about distances among the centers of multiple samples.

FIG. 8 is a view showing an example of performing a division into 24 sections to set a search section and storing information about each section in a comparison descriptor storage for an edge point, FIG. 9 is a view showing a comparison using information about the 24 sections, and FIG. 10 is a view showing an example of measuring information about distances among the centers of multiple samples.

Figure 13:
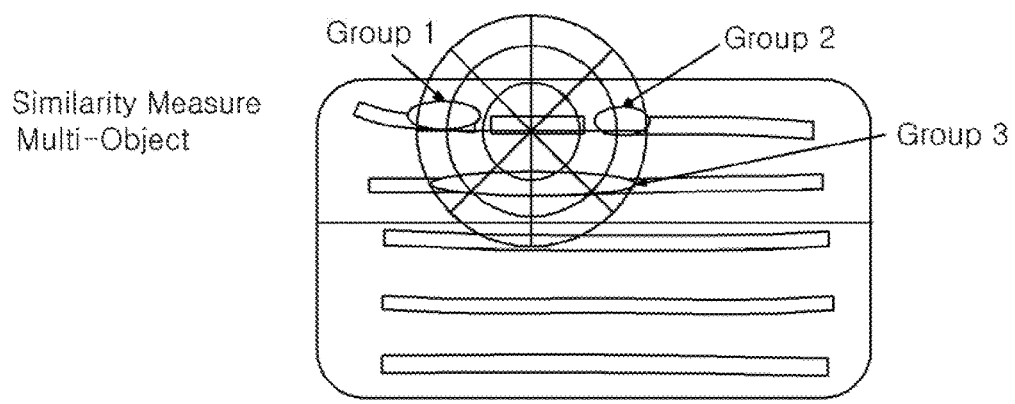
FIG. 13 is a view illustrating an example of measuring similarity of multiple samples.
Figure 14:
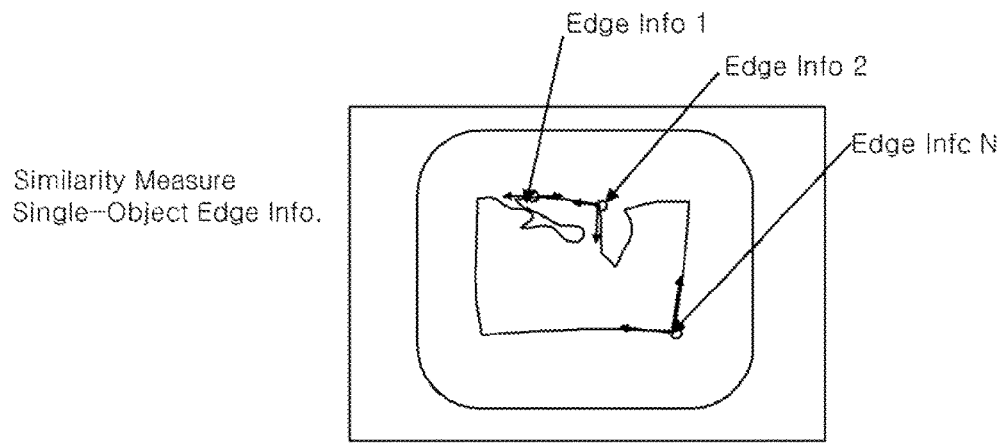
FIG. 14 is a view illustrating an example of similarity measurement using edge information for a single sample.

FIG. 13 is a view illustrating an example of measuring similarity of multiple samples, and FIG. 14 is a view illustrating an example of measuring similarity using edge information for a single sample.

A patient case identity determination unit of a digital pathology system may be configured using the above-mentioned similarity measurement method. That is, the patient case identity determination unit acquires a digital slide image from a scanner. The patient case identity determination unit requests a laboratory information system (LIS) to send patient/case information including a preprocessing step image that is obtained in a digital slide preprocessing step associated with the digital slide image. The patient case identity determination unit receives the patient/case information including the preprocessing step image from the LIS. The patient case identity determination unit comparatively analyzes a pattern of the digital slide image and the preprocessing step image to calculate a synchronization rate and stores the calculated synchronization rate.

In this case, when a client application provides a reading of the digital slide image, the patient case identity determination unit also provides information about whether the digital slide image is identical to the patient/case information based on the calculated synchronization rate. Thus, a user may check whether the current slide matches the patient/case information as soon as the user reads the digital slide image of the digital pathology system. In order to intuitively deliver information about whether the matching is achieved to the user, visual and/or auditory indications can be provided, especially, when the matching is not achieved.

Here, the client application may be a terminal configured to inquire about the digital slide image, analyze the digital sidle image, write an expert opinion (pathologist's opinion) on the digital slide image, or download the digital slide image.

In addition, the patient case identity determination unit may further perform a step of updating the patient/case information when the synchronization rate satisfies a certain criterion.

The patient case identity determination method for the digital pathology system according to the present invention may solve a problem of having to check samples in every step to prevent the samples from being unintentionally mixed with each other in a scanning step, etc. through a tissue sample during a processing process of the digital pathology system.

While the present invention has been described with reference to a few specific embodiments, the description is illustrative of the invention and is not to be construed as limiting the invention. Various modifications may occur to those skilled in the art without departing from the spirit and scope of the invention as defined by the appended claims and their equivalents.

What is claimed is:

1. A sample similarity measurement method for a digital pathology system, the sample similarity measurement method comprising:
    extracting a first main area and a second main area of each of a first digital slide image and a second digital slide image;
    aligning the first main area and the second main area;
    classifying sample types of the first main area and the second main area when the alignment is successful; and
    measuring similarity of the first main area and the second main area when the sample types are the same.

2. The sample similarity measurement method of claim 1, wherein the classifying of sample types comprises:
    determining whether there is a single sample or there are multiple samples through the number of central points detected in the first main area and the second main area;
    determining sizes of the samples of the first main area and the second main area;
    determining an arrangement shape of the samples as one of a vertical arrangement, a horizontal arrangement, and a mixture arrangement through an up-down and left-right position relation between the detected central points; and
    classifying types of the samples based on the singularity/plurality determination for the samples, the sizes of the samples, and the arrangement shape of the samples.

3. The sample similarity measurement method of claim 2, wherein,
    the measuring of similarity of the first main area and the second main area comprises, when there is one sample, measuring the similarity through shape information of the sample, color information of the sample, and edge directivity and intensity of the sample,
    the edge directivity and intensity of the sample are measured by performing cutting with three concentric circles and at an angle of 45 degrees with respect to edge points corresponding to the first main area and the second main area, performing a division into 24 sections to set a search section, each section eluding the number of surrounding edge points in the section, average color information of the surrounding edge points in the section, average edge intensity of the surrounding edge points in the section, and vector direction information of the surrounding edge points in the section, and comparing information about the 24 sections of the edge points corresponding to the first main area and the second main area.

4. The sample similarity measurement method of claim 3, wherein the measuring of similarity of the first main area and the second main area comprises, when there are multiple samples, measuring the similarity through shape information of the sample, color information of the sample, and edge directivity and intensity of the sample, information regarding distances between objects in the sample, and a cluster shape in which the objects are formed.

5. The sample similarity measurement method of claim 4, further comprising determining that the sample similarity measurement has failed when the alignment fails.

6. The sample similarity measurement method of claim 4, further comprising determining that the samples are different and ending the measurement when the sample types are classified as being different.

* * * * *